(12) United States Patent
Silvera et al.

(10) Patent No.: US 8,640,113 B2
(45) Date of Patent: Jan. 28, 2014

(54) SETJMP/LONGJMP FOR SPECULATIVE EXECUTION FRAMEWORKS

(75) Inventors: Raul Esteban Silvera, Woodbridge (CA); Kai-Ting Amy Wang, North York (CA); Peng Wu, Mt. Kisco, NY (US); Mark Wayne Yamashita, Toronto (CA); Xiaotong Zhuang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 13/026,702

(22) Filed: Feb. 14, 2011

(65) Prior Publication Data

US 2011/0289303 A1 Nov. 24, 2011

(30) Foreign Application Priority Data

May 19, 2010 (CA) .................................. 2702354

(51) Int. Cl.
*G06F 9/45* (2006.01)
(52) U.S. Cl.
USPC ............ 717/151; 717/132; 717/153; 717/156
(58) Field of Classification Search
USPC ................................. 717/131, 132, 154, 156
See application file for complete search history.

(56) References Cited

U.S. PATENT DOCUMENTS

| | | | | |
|---|---|---|---|---|
| 5,995,752 A | * | 11/1999 | Chao et al. ..................... | 717/114 |
| 6,104,873 A | * | 8/2000 | Chao et al. ..................... | 717/114 |
| 7,634,765 B2 | * | 12/2009 | Ghiya et al. ................... | 717/140 |
| 2004/0168156 A1 | * | 8/2004 | Hundt et al. ................... | 717/130 |
| 2006/0047681 A1 | * | 3/2006 | Ghiya et al. ................... | 707/102 |
| 2008/0222616 A1 | * | 9/2008 | Cheng et al. ................... | 717/137 |

OTHER PUBLICATIONS

Lattner et al., "LLVM: A Compilation Framework for Lifelong Program Analysis & Transformation", 2004.*
Dean et al., "Vortex: An Optimizing Compiler for Object-Oriented Languages", 1996.*

* cited by examiner

*Primary Examiner* — Phillip H Nguyen
(74) *Attorney, Agent, or Firm* — VanLeeuwen & VanLeeuwen; Jeanine S. Ray (57) ABSTRACT

A process for check pointing in speculative execution frameworks, identifies calls to a set of setjmp/longjmp instructions to form identified calls to setjmp/longjmp, determines a control flow path between a call to a setjmp and a longjmp pair of instructions in the identified calls to setjmp/longjmp and replaces calls to the setjmp/longjmp pair of instructions with calls to an improved_setjmp and improved_longjmp instruction pair. The process creates a context data structure in memory, computes a non-volatile save/restore set and replaces the call to improved_setjmp of the setjmp/longjmp pair of instructions with instructions to save all required non-volatile and special purpose registers and replaces a call to improved_longjmp of the setjmp/longjmp pair of instructions with instructions to restore all required non-volatile and special purpose registers and to branch to an instruction immediately following a block of code containing the call to improved_setjmp.

20 Claims, 8 Drawing Sheets

Framework 200

(Prior art)

SETJMP/LONGJMP FOR SPECULATIVE EXECUTION FRAMEWORKS

RELATED APPLICATION

This application is based on and claims the benefit of priority from Canadian Patent Application 2702354, filed May 19, 2010.

BACKGROUND

This disclosure relates generally to instruction processing mechanisms in a data processing system and more specifically to an improved instruction processing of a pair of setjmp/longjmp instructions in the data processing system.

A next generation supercomputer introduces hardware speculation support. Speculative data (in memory) is buffered in a L2 cache and discarded when a thread rolls back. However, backup and restoration of register states is typically left to software processes. A typical most straight-forward method of saving and restoring registers, as well as performing a control flow change of rolling-back, is via system setjmp and longjmp routines for example, as used in hardware vendor supplied support for software transactional memory (STM) and as well as in hardware vendor supplied runtime support.

In a typical compiler and symmetric multiprocessing (SMP) runtime implementation for speculation support, system setjmp/longjmp calls can be very inefficient. For example, setjmp/longjmp instructions are implemented as calls to a pre-compiled standard C language library function. Prior to the call, the caller must save all volatile registers and after the call these registers must be restored. In the setjmp function itself, all non-volatile registers are saved to memory, regardless of whether registers are live at the time of the call. In some hardware implementations there are a total of 36 non-volatile registers.

Similarly, system longjmp restores all non-volatile registers regardless of whether the registers are live. The setjmp overhead is incurred every time a transaction or speculative region is entered, regardless of whether the transaction/speculative region is rolled back. This overhead can be significant for small transactions that have few live-in registers. A common case scenario occurs in transactional memory because the transactional memory is often used as an alternative to traditional critical sections, which are typically very small. There is therefore a need to reduce the inefficiency of the current setjmp/longjmp implementations.

BRIEF SUMMARY

An approach is provided for hardware check pointing in speculative execution frameworks that identifies calls to a set of setjmp/longjmp instructions to form identified calls to setjmp/longjmp, determines a control flow path between a call to a setjmp and a longjmp pair of instructions in the identified calls to setjmp/longjmp and replaces calls to the setjmp/longjmp pair of instructions with calls to an improved_setjmp and improved_longjmp instruction pair. The approach further creates a context data structure in memory, computes a non-volatile save/restore set and replaces the call to improved_setjmp of the setjmp/longjmp pair of instructions with instructions to save all required non-volatile and special purpose registers and replaces a call to improved_longjmp of the setjmp/longjmp pair of instructions with instructions to restore all required non-volatile and special purpose registers and to branch to an instruction immediately following a block of code containing the call to improved_setjmp.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
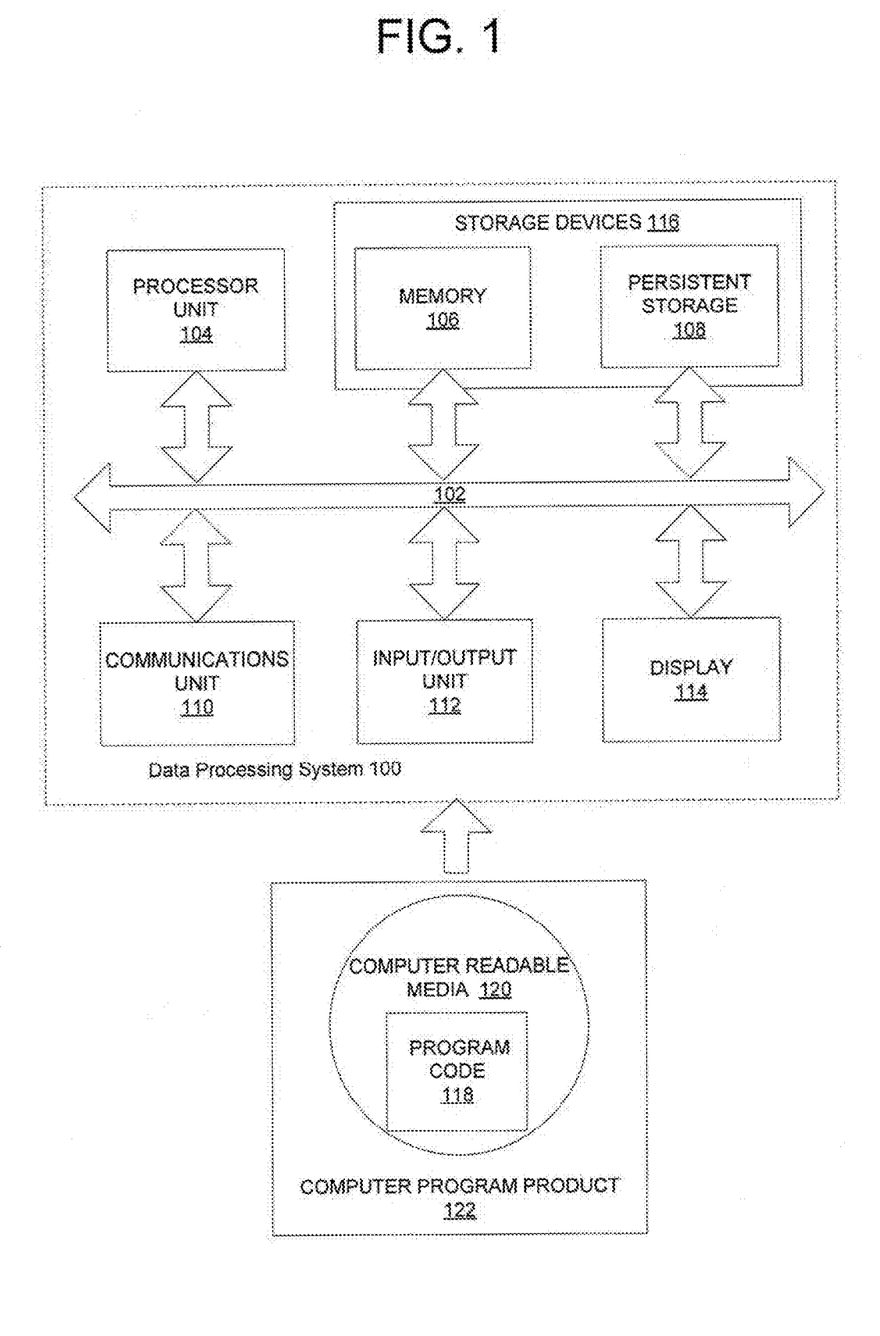
FIG. 1 is a block diagram of an exemplary data processing system operable for various embodiments of the disclosure.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for hardware check pointing in speculative execution frameworks is presented. Using data processing system 100 of FIG. 1 as an example, an illustrative embodiment provides the computer-implemented process stored in memory 106, executed by processor unit 104, for a computer-implemented process for hardware check pointing in speculative execution frameworks, identifies calls to a set of setjmp/longjmp instructions to form identified calls to setjmp/longjmp. Processor unit 104 determines a control flow path between a call to a setjmp and a longjmp pair of instructions in the identified calls to setjmp/longjmp and replaces calls to the setjmp/longjmp pair of instructions with calls to an improved_setjmp and improved_longjmp instruction pair. Processor unit 104 further creates a context data structure in memory, such as memory 106 or storage devices 116, computes a non-volatile save/restore set and replaces the call to improved_setjmp of the setjmp/longjmp pair of instructions with instructions to save all required non-volatile and special purpose registers. Processor unit 104 further replaces a call to improved_longjmp of the setjmp/longjmp pair of instructions with instructions to restore all required non-volatile and special purpose registers and to branch to an instruction immediately following a block of code containing the call to improved_setjmp.

In an alternative embodiment, program code 118 containing the computer-implemented process may be stored within computer readable media 120 as computer program product 122. In another illustrative embodiment, the process for hardware check pointing in speculative execution frameworks may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
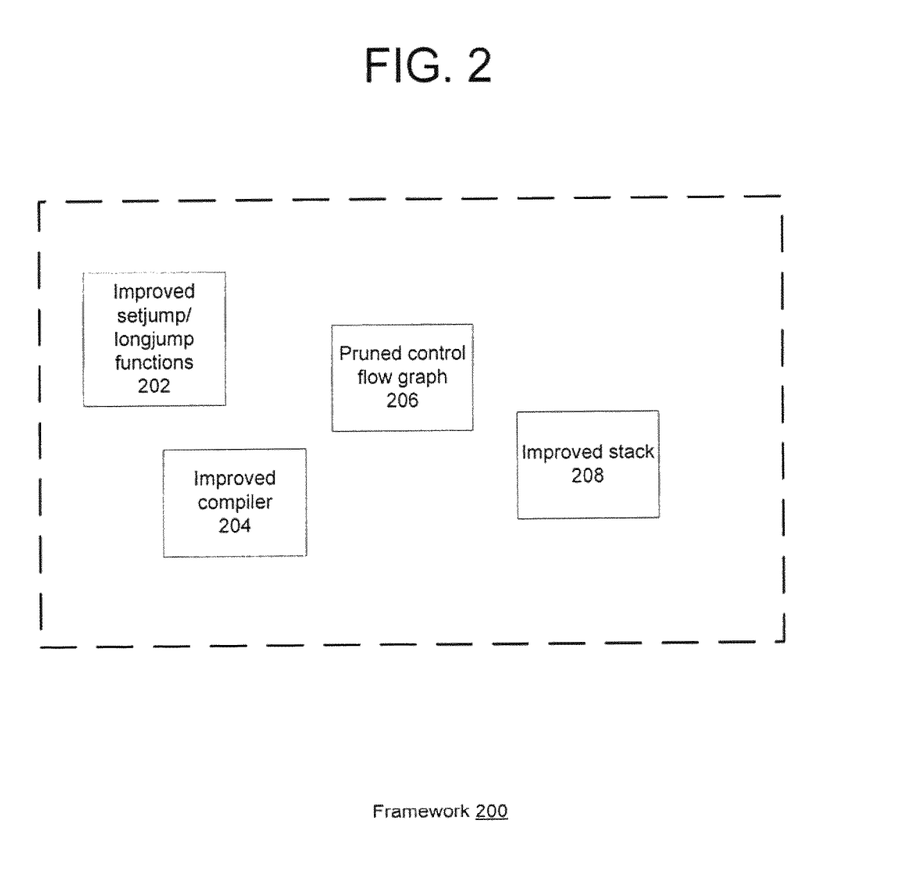
FIG. 2; is a block diagram of components of a speculative execution framework in accordance with various embodiments of the disclosure.

With reference to FIG. 2, a block diagram of components of a speculative execution framework in accordance with various embodiments of the disclosure is presented. Framework 200 is an example of a speculative execution framework in accordance with an embodiment of the disclosure.

Framework 200 comprises a number of components including improved setjmp/longjmp functions 202, improved compiler 204, pruned control flow graph 206 and improved stack 208.

Framework 200 provides a capability to reduce the setjmp and longjmp instruction processing overhead by only saving and restoring a minimal set of hardware registers necessary to maintain program consistency for rollbacks. In a worst case of a rare set of scenarios, improved setjmp/longjmp 202 is forced to default to perform in a traditional behaviour by saving and restoring a full set of non-volatile registers. Typically speculative rollback is a usage of the disclosed speculative execution framework, but the disclosed speculative execution framework is generally applicable to other user programs requiring system setjmp and longjmp functions.

Improved setjmp/longjmp 202 implementation using speculative execution frameworks such as framework 200 is effective in the context of rollback for hardware transactional memory (HTM) and thread level speculation (TLS). A problem typically solved by this technique is uncertainty regarding the state of non-volatile registers when a runtime function calls longjmp. For hardware transactional memory and thread level speculation, the runtime is responsible for restoring the state of the program back to the point of setjmp. When a runtime function calls improved_longjmp, the run-time function will not execute an epilogue of the function, and will therefore not restore the non-volatile registers used in the function. The process using an improved setjmp/longjmp function provides a method to split a runtime function into two new functions comprising a parent and a child. The parent function, which can call longjmp, is constructed such that parent function will not use any non-volatile registers.

Improved compiler 204 provides a capability to identify calls to traditional setjmp/longjmp instructions and replace the identified traditional setjmp/longjmp instructions with instructions of improved setjmp/longjmp 202. Improved compiler 204 uses pruned control flow graph 206. The typical control flow graph has been examined specifically to identify calls to setjmp/longjmp. The resulting control flow graph is reduced to focus on the identified nodes and paths associated with the identified calls to setjmp/longjmp.

Improved stack 208 accommodates a context data structure in memory to contain elements necessary for the improved process. The context data structure comprises elements including a stack pointer, table of contents pointer and a return address.

Framework 200 thus provides a capability to perform hardware check-pointing for speculative execution frameworks by implementing an improved version of a setjmp/longjmp construct. The improved setjmp/longjmp typically reduces overhead of saving and restoring non-volatile registers by determining a reduced set of registers that must be saved and restored, while still maintaining program consistency when a rollback occurs. Framework 200 generalizes the improved setjmp/longjmp implementation to replace the traditional setjmp/longjmp implementation.

A function splitting is used to ensure a given function will not use any non-volatile registers. The function splitting of framework 200 enables a program to call runtime routines without compromising the state of the non-volatile registers.

Figure 3:
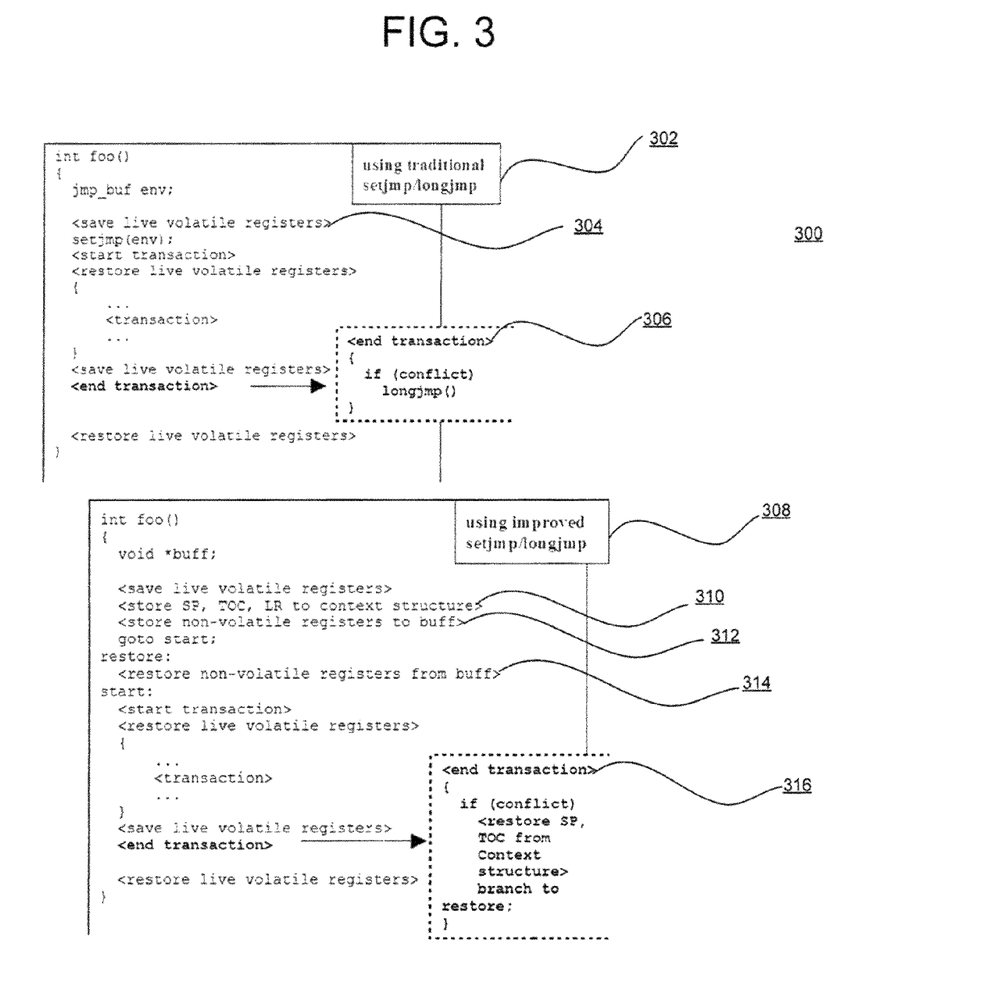
FIG. 3 is a code snippet example of an improved instruction pair of the speculative execution framework of FIG. 2, in accordance with one embodiment of the disclosure.

With reference to FIG. 3 a code snippet example of an improved instruction pair of the speculative execution framework of FIG. 2, in accordance with one embodiment of the disclosure is presented. FIG. 3 shows a C-style pseudo code snippet of a function foo, which contains a transactional region. Code snippet 300 provides a first portion in which is an example using traditional setjmp/longjmp 302 and a second portion using improved setjmp/longjmp 308. A context structure in second portion 308 is passed to end transaction or the low level interrupt handler to facility branching back.

A setjmp/longjmp construct provides a means for complex control flow. The setjmp/longjmp construct works by calling setjmp to save the state of the program, element 304, then later calling longjmp, element 306, to restore register states captured at the point of setjmp and resuming execution at the instruction immediately following the call to setjmp. A typical call to setjmp involves the following sequence:

save live volatile registers
call setjmp and pass in the address of a buffer to save register values
save all non-volatile general purpose registers and floating point registers save special purpose registers: Stack Pointer, Table Of Contents, thread ID and Link Register
will return 0
on return from setjmp, restore live volatile registers.

A typical call to longjmp, element 306 involves the following sequence:

save live volatile registers
call longjmp, passing as an argument the address of the buffer where the register values are saved
restore all non-volatile general purpose and floating point registers
restore special purpose registers: Stack Pointer, Table Of Contents, thread ID return a value not equal to 0
branch to the Link Register saved by setjmp, for example, the instruction immediately following setjmp.

The process by which the traditional setjmp/longjmp construct is replaced by the improved setjmp/longjmp 308 is transparent to the user. The compiler will use a buffer argument to properly pair each longjmp with an appropriate setjmp instruction. The compiler reserves space on a local stack for each setjmp instantiation to save the non-volatile registers and special purpose registers. When setjmp/longjmp is used for transactional memory or thread level speculation, we use a separate buffer for the context structure to save the stack pointer, the table of contents (TOC) pointer and the return address. These registers are treated specially because the registers are live-in to the transaction and may be clobbered by a runtime call that contains the longjmp, for example, the runtime call to end a transaction. The process replaces the call to improved_setjmp with instructions to save all required non-volatile element 312 and special purpose registers, element 310. A restore point, element 314 restores non-volatile registers from the buffer. The process replaces the call to improved_longjmp with instructions to restore all non-volatile and special purpose registers and branch to the instruction immediately following the improve_setjmp block of code, element 316.

A prerequisite for an improved setjmp/longjmp 308 pair to replace a traditional setjmp/longjmp 302 implementation requires the compiler, such as improved compiler 204 of framework 200 of FIG. 2 to determine the control flow path between a pair of setjmp and longjmp calls, for example in pruned control flow graph 206 also of framework 200 of FIG. 2. Without analyzing the control flow path, the compiler is unable to determine the minimal set of non-volatile registers to be saved and restored to maintain program consistency.

Figure 4:
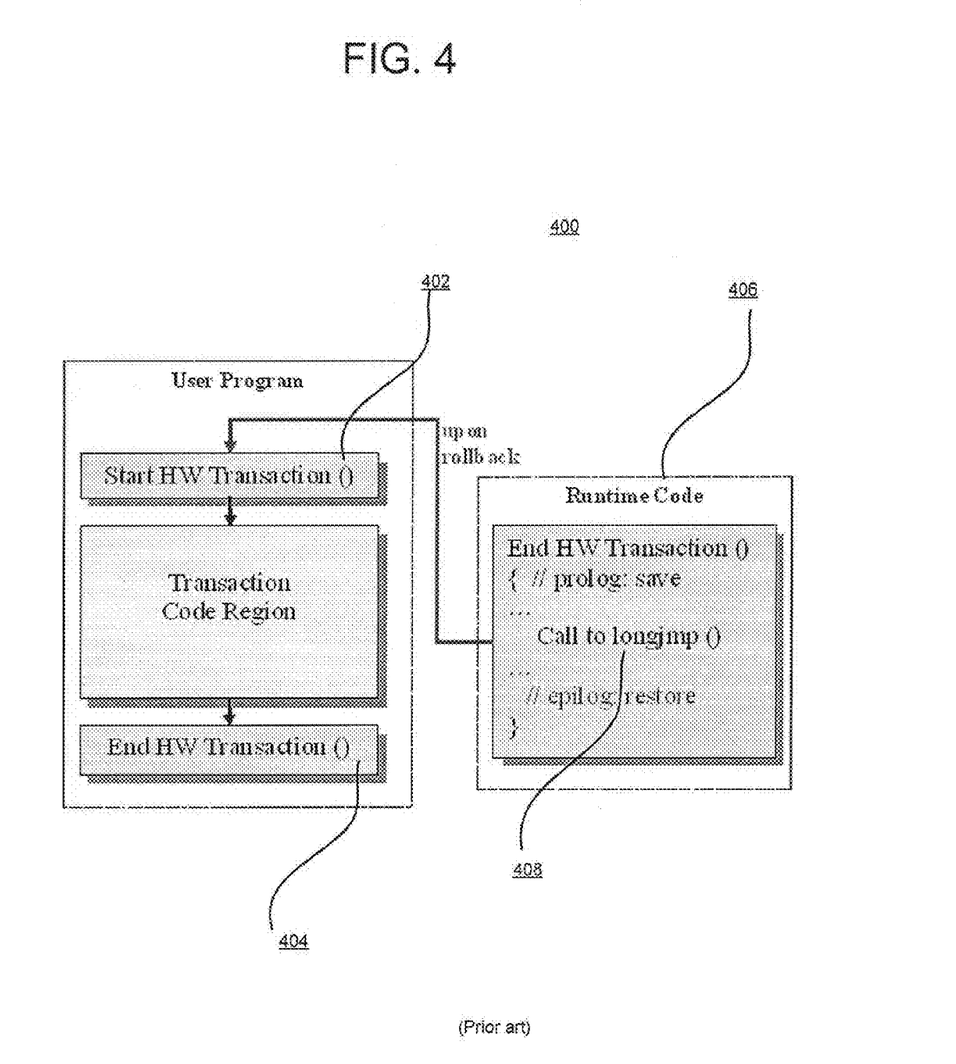
FIG. 4 is a block diagram of a traditional runtime call to a longjmp function, in accordance with the disclosure.

With reference to FIG. 4, a block diagram of a traditional runtime call to a longjmp function, in accordance with the disclosure is presented. Process 400 is an example of a traditional call during runtime by a hardware function to use a longjmp function.

Element 402 starts a sequence of processing a hardware transaction comprising a start hardware instruction, a transaction code region containing transaction code followed by an end hardware transaction, element 404. Runtime code 406 describes a process in which the end hardware transaction includes within a prolog a call to longjmp function.

A typical compiler implements transactional regions by inserting two calls, for example, a Begin HW Transaction at the beginning of a transactional region and a End HW Transaction at the end of the transactional region. These routines are part of a dynamic library, such as a transactional memory runtime library, and implement operations to initiate and commit hardware transactions, backup program states and rollback execution in the event of an abort. For software modularity, register usage of runtime routines is typically not made available to the compiler. The END HW Transaction routine invokes a traditional longjmp function and may modify non-volatile registers prior to calling longjmp. The situation could be problematic for the compiler performing setjmp/longjmp optimization because the routine breaks a prerequisite of the compiler to have information on register usage between calls of setjmp and longjmp.

Calling the Begin HW Transaction and End HW Transaction routines in a speculative region requires maintaining the consistency of all non-volatile registers. Saving and restoring of all non-volatile registers is typically required because when a longjmp occurs in a runtime routine, non-volatile registers the routine needs to restore (typically performed within a function epilogue), cannot be restored because the epilogue portion has not executed. A function fission technique solves this problem by ensuring that Begin HW Transaction and End HW Transaction do not leave any non-volatile registers 'unrestored' before calling longjmp.

Figure 5:
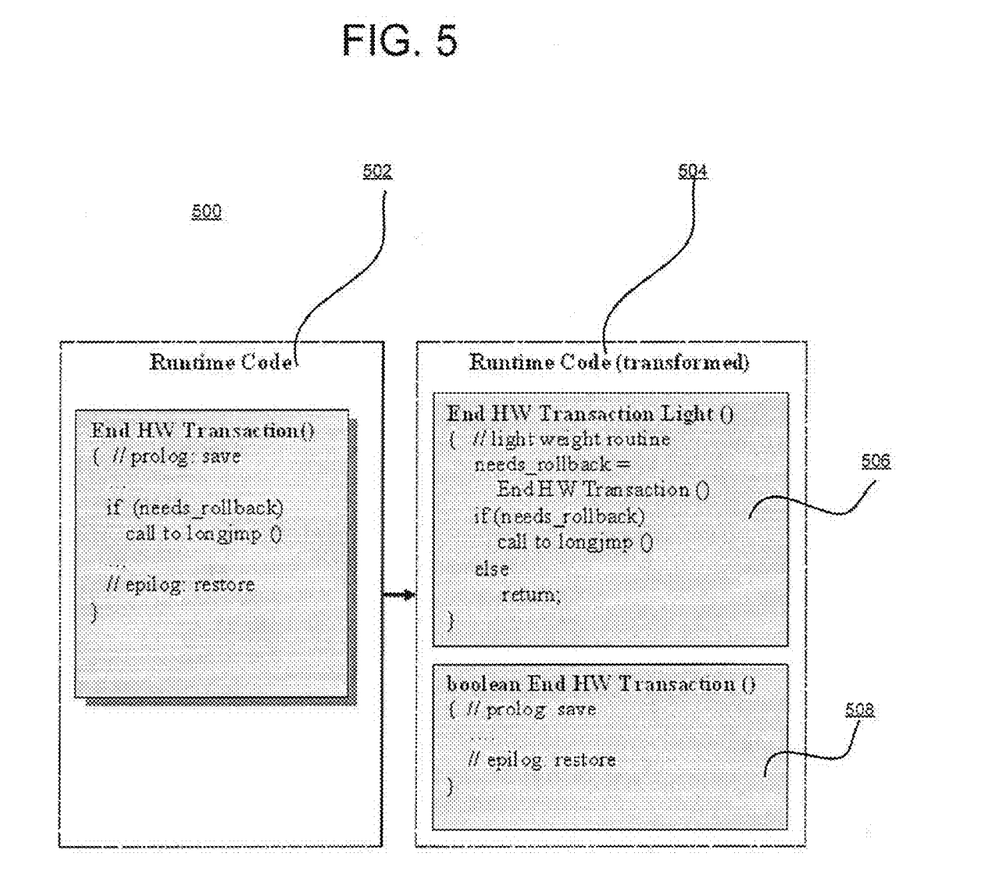
FIG. 5 is a code snippet example of a function split of an end hardware transaction using the speculative execution framework of FIG. 2, in accordance with one embodiment of the disclosure.

With reference to FIG. 5, a code snippet of a function split example of an end hardware transaction using the speculative execution framework of FIG. 2, in accordance with one embodiment of the disclosure is presented. Transformation 500 is an example of runtime code transformed in accordance with framework 200 of FIG. 2.

To address the problem in which registers may not be restored because the epilogue portion of the transaction has not executed, the END HW Transaction routine is structured to ensure non-volatile registers are never clobbered prior to a call to longjmp. To ensure this condition, transform 500 extracts code from the End HW Transaction function as shown in runtime code 502 into two new functions of runtime code 504 in a function fission technique.

A first portion 506 contains a lightweight routine having only a call to longjmp and operations that the longjmp call depends upon. A second portion 508 contains prolog code as before. The second portion 508 contains the substance of END HW Transaction, which is the code used to determine when a roll back is required. The function splitting offloads the bulk of the computation to second portion 508, so first portion 506 will be small and not need to use any non-volatile registers. Runtime code 506 can be coded using inline assembler code to ensure no clobbering of non-volatile registers occurs.

Figure 6:
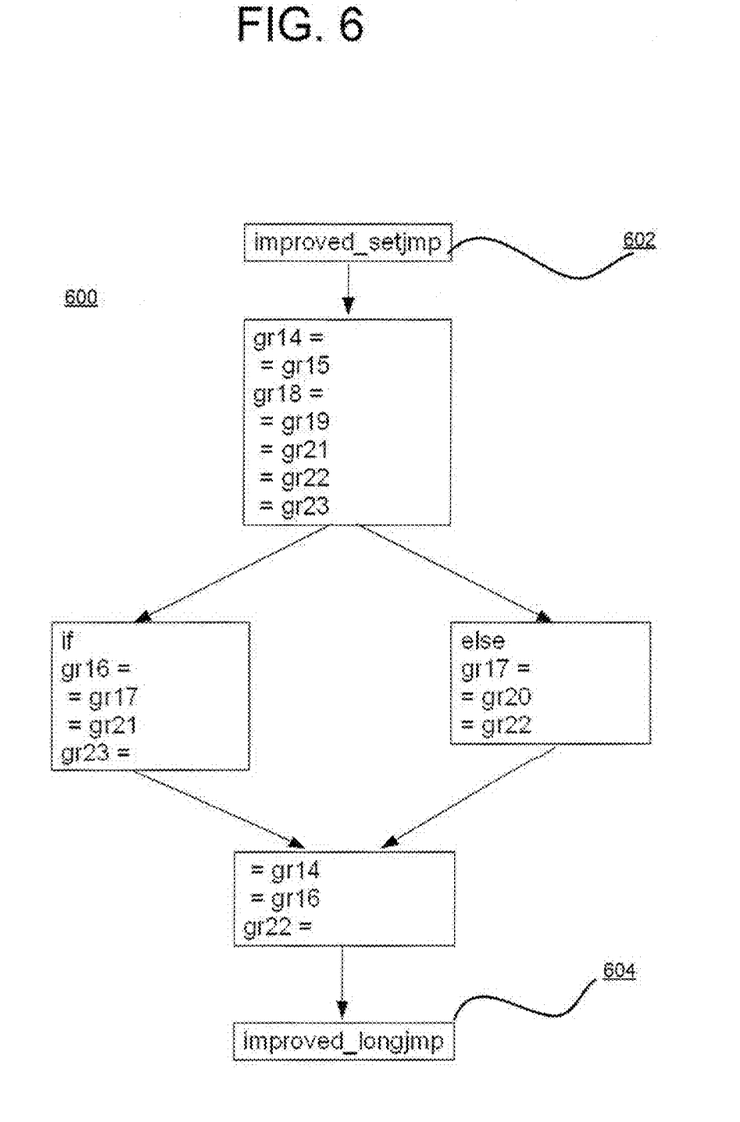
FIG. 6 is a block diagram of saved set of registers computation example in the speculative execution framework of FIG. 2, in accordance with one embodiment of the disclosure.

With reference to FIG. 6, a block diagram of a saved set of registers computation example in the speculative execution framework of FIG. 2, in accordance with one embodiment of the disclosure is presented. Computation 600 is an example of determining a save set of registers in accordance with framework 200 of FIG. 2.

A set of non-volatile registers that must be saved and restored by improved setjmp/longjmp 202 of FIG. 2 is a set of live-in non-volatile registers, which may have a different value at a call to longjmp from a value at a call to setjmp.

A term clobbered set$_{a,b}$ is defined as a set of all non-volatile registers that may have a value at instruction b that differs from a value at instruction a. In other words, a register r is included in clobbered set$_{a,b}$ if and only if there exists a path from instruction a to instruction b where the final definition of register r is to a value not known to be the value of register r at instruction a.

A live-in set$_a$ is defined as a set of non-volatile registers that are live at instruction a. A term save set$_{a,b}$ is defined as the intersection of the live-in set$_a$ and clobbered set$_{a,b}$. A save set$_{a,b}$ may then be expressed as, save set$_{a,b}$=live-in set$_a$∩clobbered set$_{a,b}$.

For a given setjmp instruction, the compiler computes save set$_{a,b}$, where a is the call to setjmp and b is the call to longjmp. When multiple calls to longjmp exist, a separate save set is computed for each longjmp, and the set of non-volatile registers that must be saved and restored is calculated as the union of all save sets.

For example a save set$_{a,b}$ for improved_setjmp 602 and improved_longjmp 604 assumes that registers are not defined to values at improved_setjmp 604 as the same values as at improved_setjmp 602. A live-in set is given as live-in set={gr15, gr17, gr19, gr20, gr21, gr22, gr23} and a clobbered set={gr14, gr16, gr17, gr18, gr22, gr23}. Therefore a computed save set is expressed as save set={gr17, gr22, gr23}. The set of non-volatile registers to be saved and restored is accordingly {gr17, gr22, gr23}.

Figure 7:
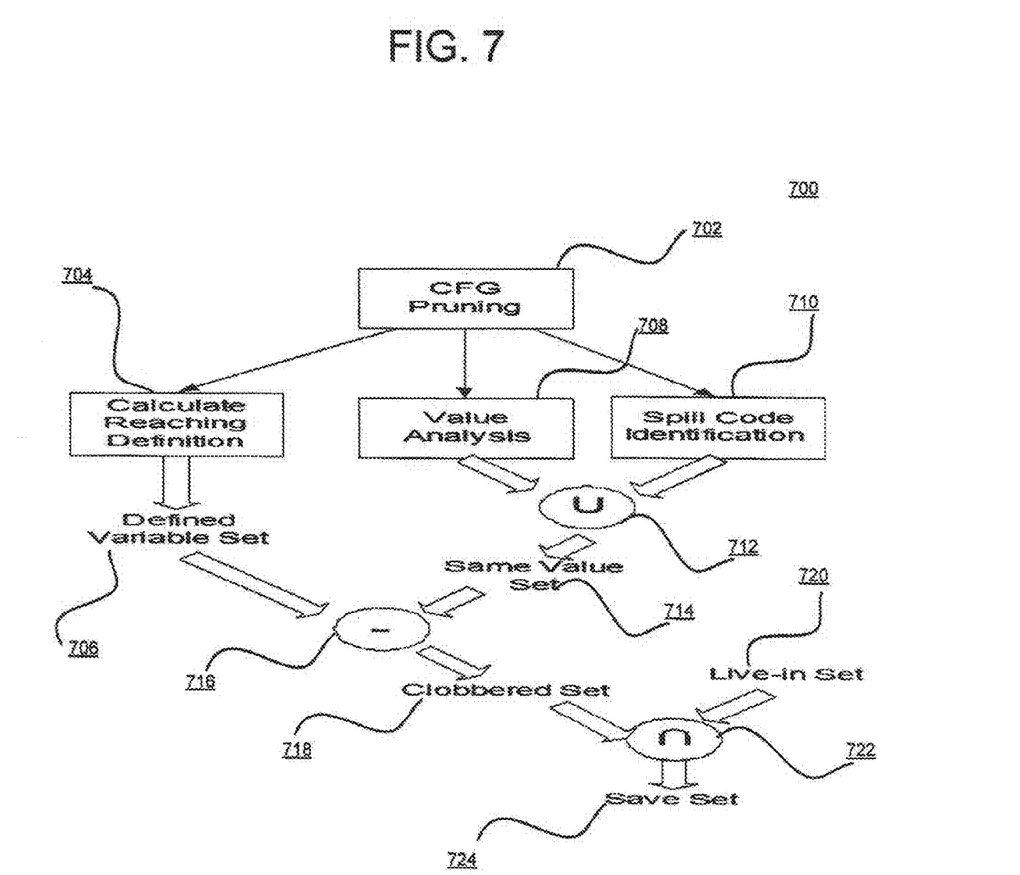
FIG. 7 is a block diagram of an overview of a saved set of registers computation using the speculative execution framework of FIG. 2, in accordance with one embodiment of the disclosure.

With regard to FIG. 7, a block diagram of an overview of a process of computing a saved set of registers using the speculative execution framework of FIG. 2, in accordance with one embodiment of the disclosure is presented. Process 700 is an example of a computation for computing a minimal save set of non-volatile registers to be saved and restored according to framework 200 of FIG. 2.

Process 700 is an overview of a basic process used to compute a save set of the non-volatile registers of the disclosure. Given a pair of setjmp/longjmp points, CFG pruning 702 is performed on the control flow graph to prune, or remove, irrelevant node data. For example, only nodes on paths from setjmp to longjmp instructions are of interest. A pruned control flow graph reduces the amount of data to traverse and process.

For each variable definition, a calculation of a reaching definition 704 is performed in which if the variable definition can reach the longjmp, the variable is put into the defined variable set 706. When a value is written to, the action does not necessarily mean that the value is changed. Therefore a value analysis 708 is performed to identify variables that keep the same value when longjmp is reached. There are typically two cases in which a same value may be maintained. In a first case, a variable may go through a series of algebraic operations and maintain the same value. For example, a variable X could be incremented by 1, then decremented by 1, resulting in the same value. In a second case, spill code identification 710 occurs in which registers used for spill code contain a result with the same value. A union of the first case and the second case 712 produces a same value set 714. All defined variables in defined variable set 706 are processed in a minus operation 716 using same value variables set 714 to yield clobbered set 718. Clobbered set 718 is intersected 722 with a live-in set 720 to generate save set 724.

In general, an expression tree is built for a variable that involves multiple (write) operations. An attempt is made to determine whether the operations can be completely offset to produce the same value.

When register usage at a particular point in the code exceeds a number of registers available, the compiler may choose to save a value to memory, referred to as spill, and restore the value at a later time. Provided that there is no interleaving call to longjmp, any definitions between the spill and restore can be disregarded. Because the analysis for non-volatile register save/restore reduction is performed after register allocation, the process provides an opportunity to recognize these sequences. Determining the reduced set of non-volatile registers to save and restore is done after register allocation. This process of determination enables the compiler to perform the evaluation on actual hardware registers, thus removing a need to use aliasing information.

With regard to non-volatile registers, when a function is called, all non-volatile registers are saved by the callee in a prologue and restored by the callee in an associated epilogue. When both prologue and epilogue are executed, any non-volatile registers used in the function should have the same value as prior to the function call.

There are typically three scenarios to consider when dealing with function calls. A trivial case occurs when the compiler is assured that no call to longjmp will occur within the function. In this case, the compiler may therefore ignore the function call when calculating the clobbered set.

In a second scenario when a function call issues a call to longjmp a compiler capable of interprocedural analysis has the ability to incorporate the function call into the analysis of the improved setjmp/longjmp implementation. For a function f, the compiler computes the save set$_{a,b}$ where a is the setjmp call and b is the call to function f. The compiler also computes save set$_{c,d}$ where c is a first instruction of function f and d is the call to longjmp. The save set for the longjmp contained in function f is expressed as: save save set$_{a,d}$=save set$_{a,b}$ U save set$_{c,d}$.

A third scenario occurs when the compiler does not have access to the body of the called function, and only has access to a declaration of the called function. This scenario may occur when using a shared library or linking to third party code. A conservative approach would assume all non-volatile registers are defined at the function call in case a longjmp occurs within the function. One approach to the scenario uses aliasing information to determine whether the function call has access to a buffer used to store saved registers. When the function call does not have access to the buffer, there is no possibility of calling longjmp and the function may be disregarded for non-volatile register save/restore reduction purposes. When a function does have the ability to access the register buffer, the compiler is forced to assume that the function may call longjmp, and the compiler must save and restore all non-volatile registers, similar to the traditional implementation.

The technique presented in this disclosure to reduce the number of non-volatile registers that must be saved and restored can also be applied in a modified fashion to volatile registers. Typically, a register allocator will save and restore all volatile registers around a call instruction, such as the call to improved setjmp. Register resurrection optimization [6] describes a method whereby volatile registers unused by a callee function are made available to the caller function by augmenting the call instruction to reflect the actual register usage of the callee function. Because improved setjmp is treated as a call the instruction may be augmented to reflect actual register usage of the final instruction sequence, which will compose improved setjmp. Therefore, volatile registers not used by improved setjmp are permitted to remain live across the call to improved setjmp. This does not apply to special purpose registers such as the stack pointer and the table of contents pointer. Any volatile register that is allowed to remain live across the call will then be treated much like a non-volatile register when computing the save/restore register set. When the volatile register that is live across improved setjmp exists in the save set for the setjmp/longjmp instruction sequence, the described process will save and restore the register to maintain program consistency.

The concept of save set computation shares some similarity with previous solutions. A most noticeable difference is that the save set computation is performed on hardware registers, not symbolic registers since memory check pointing is not needed for hardware transaction memory. Another difference is the save set is only computed for non-volatile registers. Volatile register check pointing is performed by the register allocator, which restores all volatile registers live at improved_setjmp. This is an affect of keeping improved_setjmp as a call through the compilation process until after register allocation. Yet another difference is that previous solutions do not attempt to identify variables with the same value even when the variables are modified. The identification process sharply contrasts with previous solutions in which all register check pointing is performed using traditional setjmp/longjmp.

Figure 8:
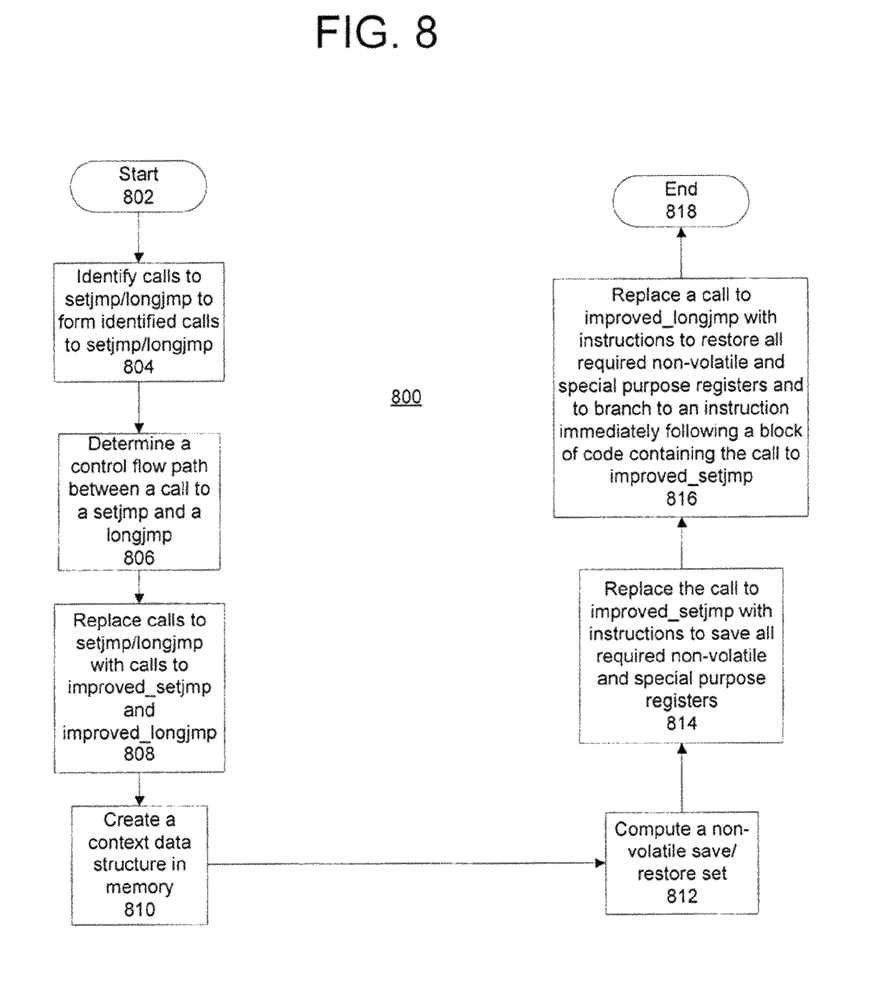
FIG. 8 is a flowchart of a setjmp/longjmp process using the speculative execution framework of FIG. 2, in accordance with one embodiment of the disclosure.

With reference to FIG. 8 a flowchart of an improved setjmp/longjmp process using the speculative execution framework of FIG. 2, in accordance with one embodiment of the disclosure is presented. Process 800 is an example of a process using the improved setjmp/longjmp process using the speculative execution framework 200 of FIG. 2.

Process 800 starts (step 802) and identifies calls to setjmp/longjmp to form identified calls to setjmp/longjmp (step 804). The identified calls to setjmp/longjmp identify the calls at compile time to the traditional forms of setjmp/longjmp instructions. Identification is performed with the context of a pruned control flow graph. For the identified calls to setjmp/longjmp process 800 determines a control flow path between a call to a setjmp and a longjmp pair of instructions (step 806). A compiler typically maintains a correspondence between a setjmp instruction and associated longjmp instruction.

Process 800 replaces calls to setjmp/longjmp with calls to improved_setjmp and improved_longjmp (step 808). The identified calls to traditional setjmp/longjmp instructions are accordingly replaced with calls to improved versions of setjmp/longjmp instructions. Process 800 further creates a context data structure in memory (step 810). The context data structure is used to store context sensitive data associated with the improved instructions. The stored information typically includes a stack pointer, table of contents pointer and a return address.

Process 800 computes a non-volatile save/restore set (step 812). The computation of the non-volatile save/restore set, in one embodiment, is calculated according to process 700 of FIG. 7.

Process 800 replaces the call to improved_setjmp with instructions to save all required non-volatile and special purpose registers (step 814). Step 814 is the first part of the two-part function splitting process described in the transformation process 500 of FIG. 5. Process 800 further replaces a call to improved_longjmp with instructions to restore all required non-volatile and special purpose registers and to branch to an instruction immediately following a block of code containing the call to improved_setjmp (step 816). Step 816 is the second part of the two-part function splitting process described in the transformation process 500 of FIG. 5. Process 800 terminates (step 818).

Thus is presented a process for performing hardware register check pointing for speculative execution models using an improved version of setjmp/longjmp instruction pairs. The process presented enables the improved version of setjmp/longjmp instructions to save and restore a reduced number of registers to typically improve performance. The generalized improved setjmp/longjmp process may also be applicable outside the speculative context in which embodiments are described. The described embodiments are typically robust enough to replace traditional setjmp/longjmp implementation while enabling traditional setjmp/longjmp implementation as a fall back alternative. A function splitting technique referred to as function fission also described in the example embodiments splits runtime routines that initiate or terminate speculation. Through this technique assurance of the state of non-volatile registers when in the routine is provided.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented process for check pointing in speculative execution frameworks, the computer-implemented process comprising:
   identifying a call to a set of setjmp/longjmp instructions, the set of setjmp/longjmp instructions comprising a setjmp and a longjmp pair of instructions;
   determining a control flow path between a call to the setjmp and the longjmp pair of instructions in the identified call;
   replacing the call to the setjmp and the longjmp pair of instructions with a call to an improved_setjmp and an improved_longjmp instruction pair;
   creating a context data structure in memory;
   computing a non-volatile save/restore set;
   replacing the call to the improved_setjmp instruction with instructions to save a plurality of required non-volatile registers and a plurality of special purpose registers; and
   replacing the call to the improved_longjmp instruction with instructions to restore the plurality of required non-volatile registers and the plurality of special purpose registers and to branch to an instruction immediately following a block of code containing the call to the improved_setjmp instruction.

2. The computer-implemented process of claim 1, wherein identifying a call to a set of setjmp/longjmp instructions further comprises:
   identifying a plurality of calls to a plurality of sets of setjmp/longjmp instructions during a compilation using a compiler; and
   using a buffer argument to properly pair each longjmp instruction with an appropriate setjmp instruction.

3. The computer-implemented process of claim 1, wherein determining a control flow path between a call to the setjmp and the longjmp pair of instructions in the identified call further comprises:
   pruning a control flow graph to form a pruned control flow graph; and
   traversing the pruned control flow graph.

4. The computer-implemented process of claim 1, wherein creating a context data structure in memory further comprises:
   allocating a separate buffer for the context data structure to save data wherein the save data includes a stack pointer, a table of contents (TOC) pointer and a return address.

5. The computer-implemented process of claim 1, wherein computing a non-volatile save/restore set further comprises:
   calculating a reaching definition for each of a plurality of variable definitions, wherein a variable is placed into a defined variable set when the corresponding variable definition is capable of reaching the longjmp;
   performing a value analysis to identify one or more variables that keep the same value when the longjmp is reached to form identified variables;
   performing a spill code identification, wherein one or more registers used for spill code contain a result with the same value, to form identified spill code;
   performing a union of the identified variables and the identified spill code to produce a same value set;
   subtracting the same value set from the defined variable set to form a clobbered set; and
   intersecting the clobbered set with a live-in set to generate a save set.

6. The computer-implemented process of claim 1, wherein identifying a call to a set of setjmp/longjmp instructions further comprises:
   reserving space on a local stack for a setjmp instantiation to save non-volatile registers and special purpose registers.

7. The computer-implemented process of claim 1, wherein replacing the call to the improved_setjmp instruction and the improved_longjmp instruction pair further comprises:
   splitting a runtime function into a new parent function and a new child function, wherein the new parent function is capable of calling longjmp and wherein the new parent function is incapable of using non-volatile registers.

8. A computer program product for check pointing in speculative execution frameworks, the computer program product comprising:
   a computer recordable-type media containing computer executable program code stored thereon, the computer executable program code comprising:
   computer executable program code for identifying a calls to a set of setjmp/longjmp instructions, the set of setjmp/longjmp instructions comprising a setjmp and a longjmp pair of instructions;

computer executable program code for determining a control flow path between a call to the setjmp and the longjmp pair of instructions in the identified call;

computer executable program code replacing the call to the setjmp and the longjmp pair of instructions with a call to an improved_setjmp and an improved_longjmp instruction pair;

computer executable program code for creating a context data structure in memory;

computer executable program code for computing a non-volatile save/restore set;

computer executable program code for replacing the call to the improved_setjmp instruction with instructions to save a plurality of required non-volatile registers and a plurality of special purpose registers; and computer executable program code for replacing the call to the improved_longjmp instruction with instructions to restore the plurality of required non-volatile registers and the plurality of special purpose registers and to branch to an instruction immediately following a block of code containing the call to the improved_setjmp instruction.

9. The computer program product of claim 8, wherein computer executable program code for identifying a call to a set of setjmp/longjmp instructions further comprises:

computer executable program code for identifying a plurality of calls to a plurality of sets of setjmp/longjmp instructions during a compilation using a compiler; and computer executable program code for using a buffer argument to properly pair each longjmp instruction with an appropriate setjmp instruction.

10. The computer program product of claim 8, wherein computer executable program code for determining a control flow path between a call to the setjmp and the longjmp pair of instructions in the identified call further comprises:

computer executable program code for pruning a control flow graph to form a pruned control flow graph; and computer executable program code for traversing the pruned control flow graph.

11. The computer program product of claim 8, wherein computer executable program code for creating a context data structure in memory further comprises:

computer executable program code for allocating a separate buffer for the context data structure to save data wherein the save data includes a stack pointer, a table of contents (TOC) pointer and a return address.

12. The computer program product of claim 8, wherein computer executable program code for computing a non-volatile save/restore set further comprises:

computer executable program code for calculating a reaching definition for each of a plurality of variable definitions wherein a variable is placed into a defined variable set when the corresponding variable definition is capable of reaching the longjmp;

computer executable program code for performing a value analysis to identify one or more variables that keep the same value when the longjmp is reached to form identified variables;

computer executable program code for performing a spill code identification, wherein one or more registers used for spill code contain a result with the same value, to form identified spill code;

computer executable program code for performing a union of the identified variables and the identified spill code to produce a same value set;

computer executable program code for subtracting the same value set from the defined variable set to form a clobbered set; and computer executable program code for intersecting the clobbered set with a live-in set to generate a save set.

13. The computer program product of claim 8, wherein computer executable program code for identifying the call to a set of setjmp/longjmp instructions further comprises:

computer executable program code for reserving space on a local stack for each setjmp instantiation to save non-volatile registers and special purpose registers.

14. The computer program product of claim 8, wherein computer executable program code for replacing the call to the improved_setjmp instruction and the improved_longjmp instruction pair further comprises:

computer executable program code for splitting a runtime function into a new parent function and a new child function, wherein the new parent function is capable of calling longjmp and wherein the new parent function is incapable of using non-volatile registers.

15. An apparatus for check pointing in speculative execution frameworks, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

identify a call to a set of setjmp/longjmp instructions, the set of setjmp/longjmp instructions comprising a setjmp and a longjmp pair of instructions;

determine a control flow path between a call to the setjmp and the longjmp pair of instructions in the identified call;

replace the call to the setjmp and the longjmp pair of instructions with a call to an improved_setjmp and an improved_longjmp instruction pair;

create a context data structure in memory;

compute a non-volatile save/restore set;

replace the call to the improved_setjmp instruction with instructions to save a plurality of required non-volatile registers and a plurality of special purpose registers; and replace the call to the improved_longjmp instruction with instructions to restore the plurality of required non-volatile registers and the plurality of special purpose registers and to branch to an instruction immediately following a block of code containing the call to the improved_setjmp instruction.

16. The apparatus of claim 15, wherein the processor unit executes the computer executable program code to identify a call to a set of setjmp/longjmp instructions further directs the apparatus to:

identify a plurality of calls to a plurality of sets of setjmp/longjmp instructions during a compilation using a compiler; and use a buffer argument to properly pair each longjmp instruction with an appropriate setjmp instruction.

17. The apparatus of claim 15, wherein the processor unit executes the computer executable program code to determine a control flow path between a call to the setjmp and the longjmp pair of instructions in the identified call further directs the apparatus to:

prune a control flow graph to form a pruned control flow graph; and traverse the pruned control flow graph.

18. The apparatus of claim 15, wherein the processor unit executes the computer executable program code to create a context data structure in memory further directs the apparatus to:

allocate a separate buffer for the context data structure to save data wherein the save data includes a stack pointer, a table of contents (TOC) pointer and a return address.

19. The apparatus of claim 15, wherein the processor unit executes the computer executable program code to compute a non-volatile save/restore set further directs the apparatus to:

calculate a reaching definition for each of a plurality of variable definitions, wherein a variable is placed into a defined variable set when the corresponding variable definition is capable of reaching the longjmp;

perform a value analysis to identify one or more variables that keep the same value when the longjmp is reached to form identified variables;

perform a spill code identification, wherein one or more registers used for spill code contain a result with the same value, to form identified spill code;

perform a union of the identified variables and the identified spill code to produce a same value set;

subtract the same value set from the defined variable set to form a clobbered set;

intersect the clobbered set with a live-in set to generate a save set.

20. The apparatus of claim 15, wherein the processor unit executes the computer executable program code to replace the call to the improved_setjmp and the improved_longjmp instruction pair further directs the apparatus to:

split a runtime function into a new parent function and a new child function, wherein the new parent function is capable of calling longjmp and wherein the new parent function is incapable of using non-volatile registers.

* * * * *